US011187134B2

(12) United States Patent
Kruiswyk

(10) Patent No.: US 11,187,134 B2
(45) Date of Patent: Nov. 30, 2021

(54) EXHAUST FLOW CONTROL VALVE WITH INTEGRATED WASTEGATE

(71) Applicant: Perkins Engines Company LTD, Peterborough (GB)

(72) Inventor: Richard Kruiswyk, Dunlap, IL (US)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/764,457

(22) PCT Filed: Nov. 1, 2018

(86) PCT No.: PCT/EP2018/079922
§ 371 (c)(1),
(2) Date: May 15, 2020

(87) PCT Pub. No.: WO2019/096588
PCT Pub. Date: May 23, 2019

(65) Prior Publication Data
US 2020/0362745 A1    Nov. 19, 2020

(30) Foreign Application Priority Data

Nov. 15, 2017  (EP) .................................... 17201958

(51) Int. Cl.
*F01N 13/10*       (2010.01)
*F01D 17/14*       (2006.01)
(Continued)

(52) U.S. Cl.
CPC ......... *F01N 13/107* (2013.01); *F01D 17/146* (2013.01); *F02B 37/02* (2013.01); *F02B 37/183* (2013.01); *F02B 37/22* (2013.01)

(58) Field of Classification Search
CPC .... F01N 13/107; F01D 17/105; F01D 17/146; F01D 17/148; F02B 37/02; F02B 37/025;
(Continued)

(56) References Cited

U.S. PATENT DOCUMENTS 4,389,845 A    6/1983  Koike et al.
6,073,447 A    6/2000  Kawakami et al.
(Continued)

FOREIGN PATENT DOCUMENTS

DE    29917606 U1    5/2000
DE    10303777 A1    8/2004
(Continued)

OTHER PUBLICATIONS

International Search Report for Application No. PCT/EP2018/079922; reported on Jan. 10, 2019.

*Primary Examiner* — Jesse S Bogue
*Assistant Examiner* — Loren C Edwards

(57) ABSTRACT

An exhaust manifold for an internal combustion engine is provided. The manifold comprises at least one first exhaust gas inlet connectable to a first bank of cylinders of the engine, and at least one second exhaust gas inlet connectable to a second bank of cylinders of the engine. First and second exhaust gas outlets are connectable to respective first and second volutes of a twin volute turbocharger. At least one wastegate outlet is connectable to a bypass passage which bypasses the turbocharger. A diverter valve is located within the manifold, wherein the diverter valve is adapted to selectively direct exhaust gas from the first and second inlets to at least one of the first and second exhaust gas outlets and the wastegate outlet. A turbocharger is also provided having the same diverter valve arrangement, as are internal combustion engines having either the manifold or turbocharger, and a vehicle having such an internal combustion engine.

14 Claims, 6 Drawing Sheets

(51) Int. Cl.
  *F02B 37/02* (2006.01)
  *F02B 37/18* (2006.01)
  *F02B 37/22* (2006.01)

(58) Field of Classification Search
  CPC ...... F02B 37/18; F02B 37/183; F02B 37/186;
       F02B 37/22; F16K 5/00–08; F16K 11/08;
          F02M 26/43; F02M 26/44
  See application file for complete search history.

(56) References Cited

U.S. PATENT DOCUMENTS

| | | |
|---|---|---|
| 6,941,755 B2 | 9/2005 | Bucknell et al. |
| 6,983,596 B2 * | 1/2006 | Frankenstein .......... F02B 37/22 |
| | | 60/602 |
| 7,269,950 B2 | 9/2007 | Pedersen et al. |
| 7,428,814 B2 | 9/2008 | Pedersen et al. |
| 8,585,355 B2 | 11/2013 | Henderson et al. |
| 2005/0086936 A1 | 4/2005 | Bucknell |
| 2016/0024999 A1 | 1/2016 | Grabowska et al. |
| 2016/0208680 A1 * | 7/2016 | McConville .......... F02B 37/183 |
| 2018/0328268 A1 * | 11/2018 | Babak ................... F02B 37/22 |

FOREIGN PATENT DOCUMENTS

| | | |
|---|---|---|
| DE | 102006009298 A1 | 9/2007 |
| DE | 102006031702 A1 | 1/2008 |
| DE | 102006058102 A1 | 6/2008 |
| DE | 102013003031 A1 | 8/2014 |
| DE | 102015105219 A1 | 10/2016 |
| DE | 102016204076 A1 | 11/2016 |
| EP | 1440222 B1 | 9/2006 |

* cited by examiner

US 11,187,134 B2

EXHAUST FLOW CONTROL VALVE WITH INTEGRATED WASTEGATE

CROSS-REFERENCE TO RELATED APPLICATION

This Application is a 35 USC § 371 U.S. National Stage filing of International Application No. PCT/EP2018/079,922 filed on Nov. 1, 2018 which claims priority under the Paris Convention to European Patent Application No. 17201958.0 filed Nov. 15, 2017.

FIELD OF THE INVENTION

The present invention is directed to the field of internal combustion engines, and specifically to the exhaust systems of turbocharged internal combustion engines. The invention is an exhaust flow control valve for such systems, where the valve controls exhaust flow and includes an integrated wastegate.

BACKGROUND OF THE INVENTION

Turbocharging has been used in relation to internal combustion engines for many years. In relatively recent years, twin volute (also known as twin scroll) turbochargers have been introduced in an effort to improve boost response, increase power throughout the power band, and at the same time improve fuel efficiency. These twin volute turbochargers have the turbine located in a housing whereby it receives exhaust flow from separate banks of cylinders in the engine in turn through the separate volutes. This alternating sequence of exhaust flow helps reduce lag and bring the improvements discussed above.

To further improve the performance of twin volute turbochargers it is also known to provide the turbocharger housing with a diverter valve which can selectively divert exhaust flow to one or both volutes depending upon engine state and performance requirements at any given time. In order to avoid a turbocharger overboost or overspeed event, the turbocharger housing is also provided with a wastegate, or exhaust bypass, which can be opened to allow exhaust flow to bypass the turbocharger when necessary. An example of such an arrangement in a turbocharger can be seen in EP1440222B1.

Providing both a diverter valve and wastegate as separate components increases the complexity and associated cost of the turbocharger. In addition, in EP'222 and other prior art disclosures the twin volutes of the turbocharger receive the exhaust flow from a single inlet passage or turbine throat, so the exhaust flows from the separate banks of cylinders can interfere with one another in the throat, thus reducing the performance benefits of the twin volute turbocharger.

It is an aim of the present invention to obviate or mitigate one or more of these disadvantages.

SUMMARY OF THE INVENTION

According to a first aspect of the present invention, there is provided an exhaust manifold for an internal combustion engine, the manifold comprising:
at least one first exhaust gas inlet connectable to a first bank of cylinders of the engine;
at least one second exhaust gas inlet connectable to a second bank of cylinders of the engine;
first and second exhaust gas outlets connectable to respective first and second volutes of a twin volute turbocharger;
at least one wastegate outlet connectable to a bypass passage which bypasses the turbocharger; and
a diverter valve located within the manifold, wherein the diverter valve is adapted to selectively direct exhaust gas from the first and second inlets to at least one of the first and second exhaust gas outlets and the wastegate outlet.

According to a second aspect of the invention, there is provided an internal combustion engine comprising first and second banks of cylinders, a twin volute turbocharger and an exhaust manifold according to the first aspect of the invention.

According to a third aspect of the invention, there is provided a twin volute turbocharger for an internal combustion engine, the turbocharger comprising:
a first exhaust gas inlet connectable to a first exhaust gas outlet of an exhaust manifold;
a second exhaust gas inlet separate from the first exhaust gas inlet and connectable to a second exhaust gas outlet of the exhaust manifold;
first and second volutes in fluid communication with the respective first and second exhaust gas inlets;
at least one wastegate outlet connectable to a bypass passage which bypasses the first and second volutes; and
a diverter valve located between the exhaust gas inlets and the volutes, wherein the diverter valve is adapted to selectively direct exhaust gas from the first and second inlets to at least one of the first and second volutes and the wastegate outlet.

According to a fourth aspect of the invention, there is provided an internal combustion engine comprising an exhaust manifold, and a twin volute turbocharger according to the third aspect of the invention.

According to a fifth aspect of the invention, there is provided a vehicle having an internal combustion engine according to either the second or fourth aspect of the invention.

BRIEF DESCRIPTION OF THE DRAWINGS

Preferred embodiments of the present invention will now be described, by way of example only, with reference to the following drawings.

DETAILED DESCRIPTION OF THE DRAWINGS

Figure 1:
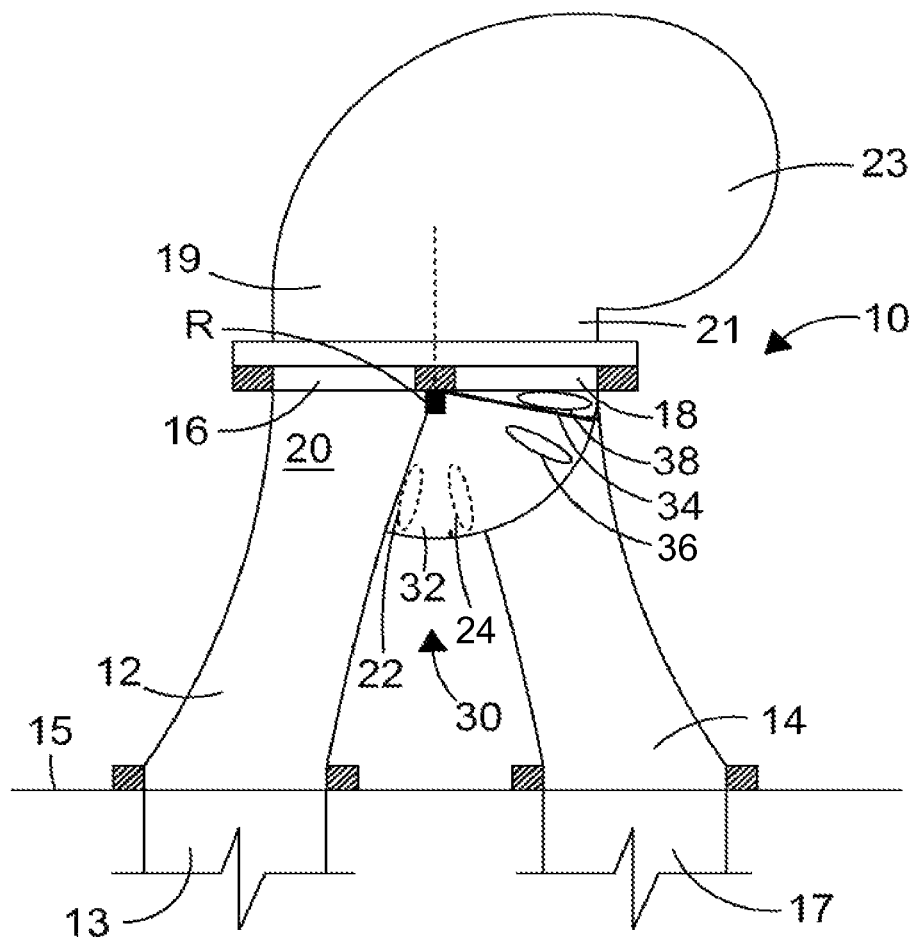
FIGS. 1-3 are schematic section views through a first embodiment of an exhaust manifold when in first, second and third states, respectively.
Figure 2:
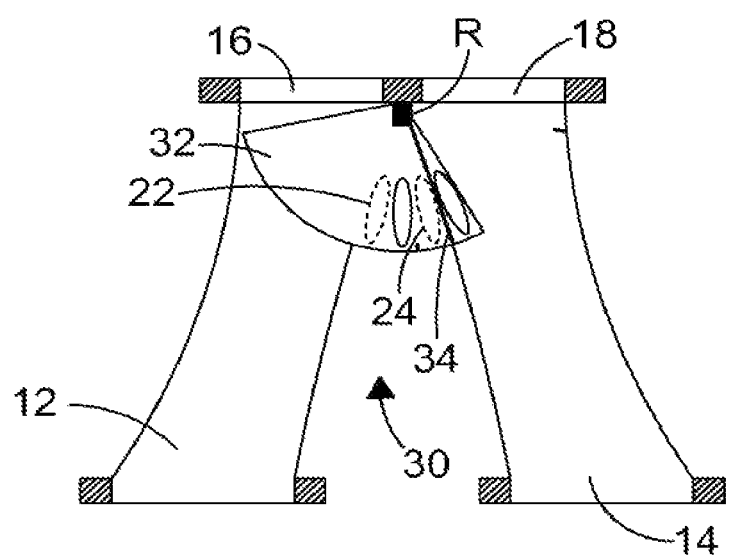
Figure 3:
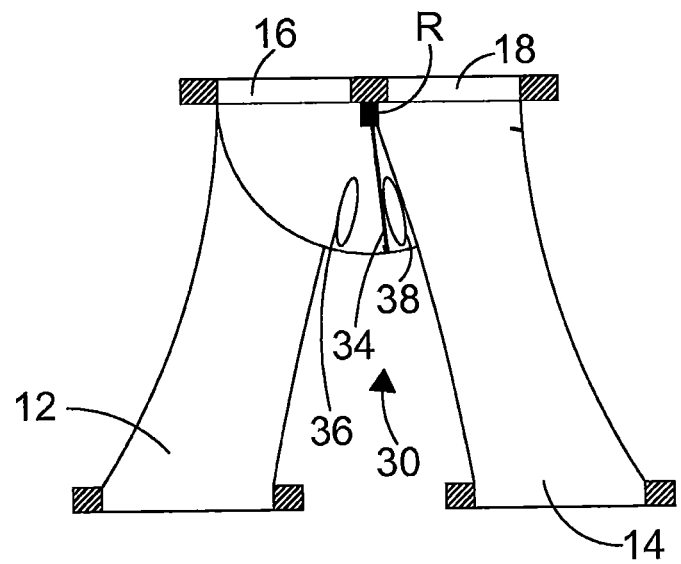

A first embodiment of an exhaust manifold for an internal combustion engine exhaust system is shown in schematic section views in FIGS. 1-3. Those figures illustrate various states of the manifold. FIG. 1 illustrates how in use the manifold would be connected between banks of cylinders of the engine and a twin volute, or twin scroll, turbocharger. However, those elements have been omitted from the other figures for clarity.

Referring to FIG. 1, the manifold is generally designated 10 and comprises a first exhaust gas inlet 12, which is connectable in a known manner to a first bank of cylinders 13 of an internal combustion engine 15. The manifold 10 also comprises a second exhaust gas inlet 14, which is connectable in the same way to a second bank of cylinders 17 of the engine 15. Thus, the first and second exhaust gas inlets 12,14 receive the exhaust gas issuing from the first and second banks of cylinders, respectively. The engine may be a 6 or 12 cylinder engine, wherein each bank comprises 3 or 6 cylinders.

The manifold 10 also comprises separate first and second exhaust gas outlets 16,18 which are connectable in use to respective first and second volutes 19,21 of a twin volute turbocharger 23. Twin volute turbochargers separate exhaust events so as to prevent exhaust pulse interference between cylinders.

Located between, and in fluid communication with, the exhaust inlets 12,14 and outlets 16,18 is an exhaust chamber 20 which has at least one wastegate outlet connectable to a passage which bypasses the turbocharger 23. In the illustrated embodiment the chamber 20 has a pair of wastegate outlets 22,24.

Also located in the chamber 20 is a diverter valve 30 which is adapted to control the flow of exhaust gas from the first and second exhaust gas inlets 12,14 to at least one of the first and second exhaust gas outlets 16,18 and the wastegate outlets 22,24. The diverter valve 30 comprises a rotatable valve body having a base 32 shaped as a segment of a circle, where the base 32 may rotate under the power of a known actuator mechanism (e.g. solenoid) about an axis of rotation R. An upwardly projecting diverter plate 34 is mounted upon the rotatable base 32, and it is this diverter plate which diverts the exhaust gas flow. The base 32 is also provided with at least one wastegate aperture whose shape preferably corresponds with that of the at least one wastegate outlet in the chamber 20. As there are two wastegate outlets 22,24 in this embodiment there are a corresponding pair of wastegate apertures 36,38 in the base 32. The wastegate apertures 36,38 preferably lie either side of the diverter plate 34.

The three states of the manifold 10 shown in FIGS. 1-3, which are dictated by positions of the diverter valve 30, will be described in detail below.

Figure 4:
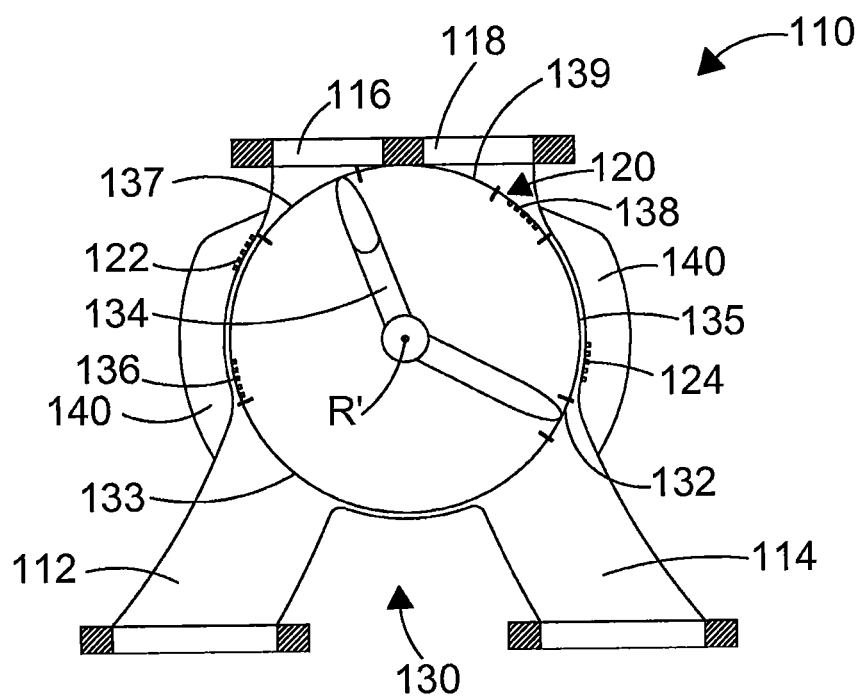
FIG. 4 is a schematic section view through a second embodiment of an exhaust manifold when in the first state.

An alternative embodiment of exhaust manifold is shown in FIG. 4 and generally designated 110. As with the first embodiment, this manifold 110 comprises a first exhaust gas inlet 112, which is connectable in a known manner to a first bank of cylinders of an internal combustion engine. The manifold 110 also comprises a second exhaust gas inlet 114, which is connectable in the same way to a second bank of cylinders of the engine.

The manifold 110 also comprises separate first and second exhaust gas outlets 116,118 which are connectable in use to respective first and second volutes of a twin volute turbocharger. Located between, and in fluid communication with, the exhaust inlets 112,114 and outlets 116,118 is an exhaust chamber 120 which has at least one wastegate outlet connectable to a passage which bypasses the turbocharger. In the illustrated embodiment the chamber 20 has a pair of wastegate outlets 122,124 which, when open, are in fluid communication with a generally annular wastegate chamber 140 which is arranged in the form of a jacket about the exterior of the exhaust chamber 120. It is from the wastegate chamber 140 that the exhaust would flow to the bypass passage when the wastegate outlets 122,124 are open.

Also located in the chamber 120 is a diverter valve 130 which is adapted to control the flow of exhaust gas from the first and second exhaust gas inlets 112,114 to at least one of the first and second exhaust gas outlets 116,118 and the wastegate outlets 122,124. The diverter valve 130 comprises a rotatable valve body 132 having a generally cylindrical shape, where the body 132 may rotate under the power of a known actuator mechanism (e.g. solenoid) about an axis of rotation R'. The body 132 and the axis of rotation R' lie generally perpendicular to the direction of flow of exhaust gas through the manifold. The interior of the valve body 132 is divided into two portions by a diverter plate 134 which runs the length of the valve body, and it is this diverter plate which diverts the exhaust gas flow. The cylindrical wall of the body 132 has a pair of exhaust inlet apertures 133,135 and a pair of exhaust outlet apertures 137,139 which permit exhaust gas to flow through the valve body 132 depending upon its rotational position. One exhaust inlet aperture and one exhaust outlet aperture are provided on either side of the diverter plate 134. The body 132 also has at least one wastegate aperture whose shape and size preferably corresponds with that of the at least one wastegate outlet in the chamber 120. As there are two wastegate outlets 122,124 in this embodiment there are a corresponding pair of wastegate apertures 136,138 in the base 32.

Figure 5:
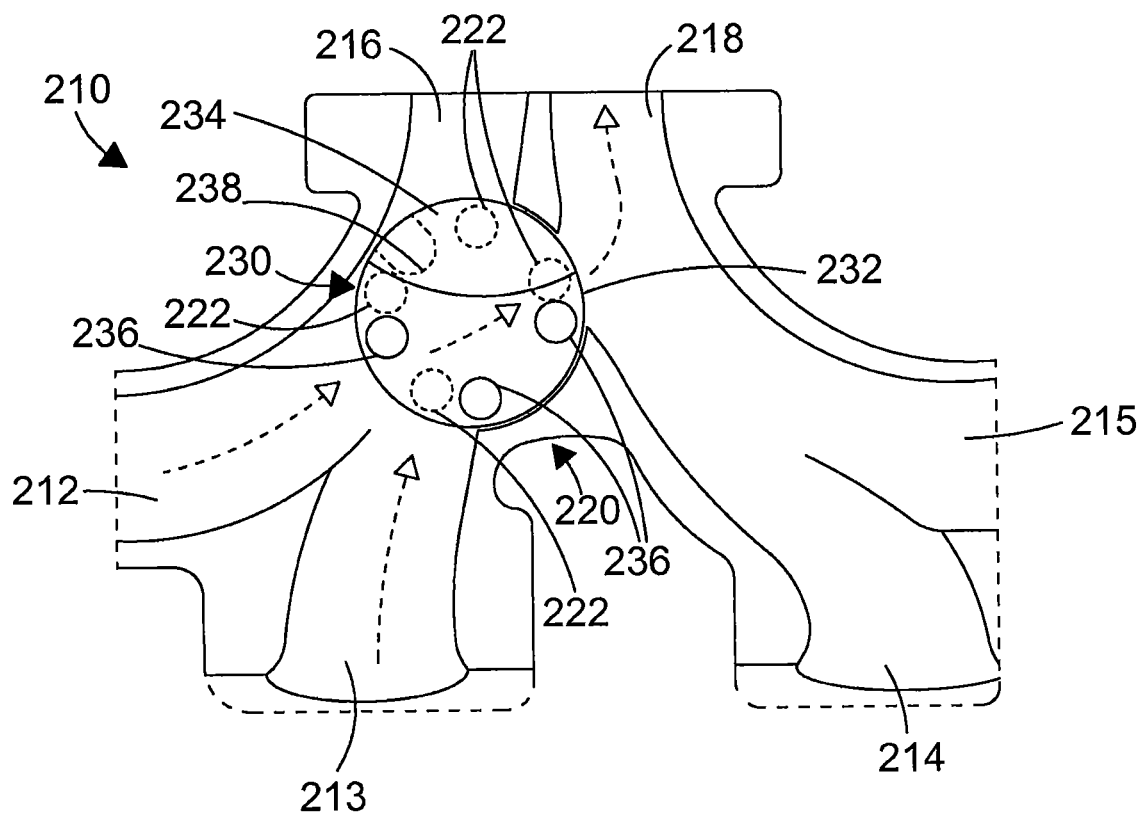
FIGS. 5-7 are schematic section views through a third embodiment of an exhaust manifold when in the first, second and third states, respectively.
Figure 6:
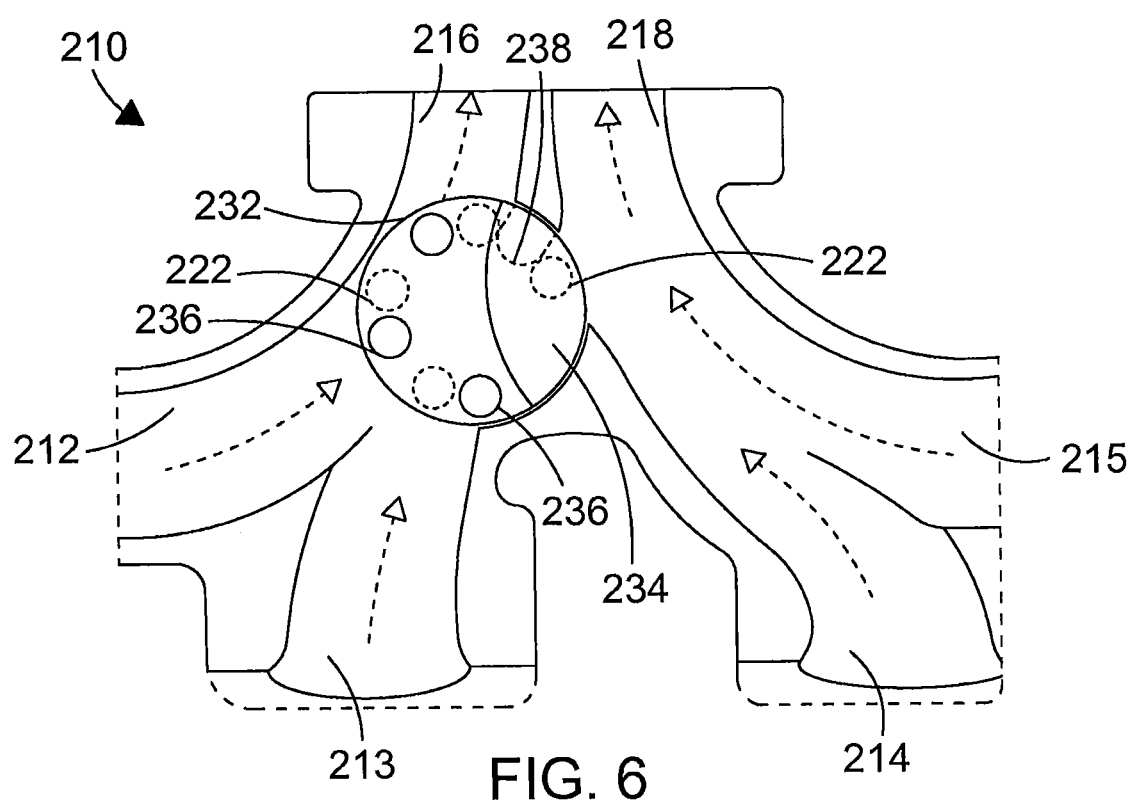
Figure 7:
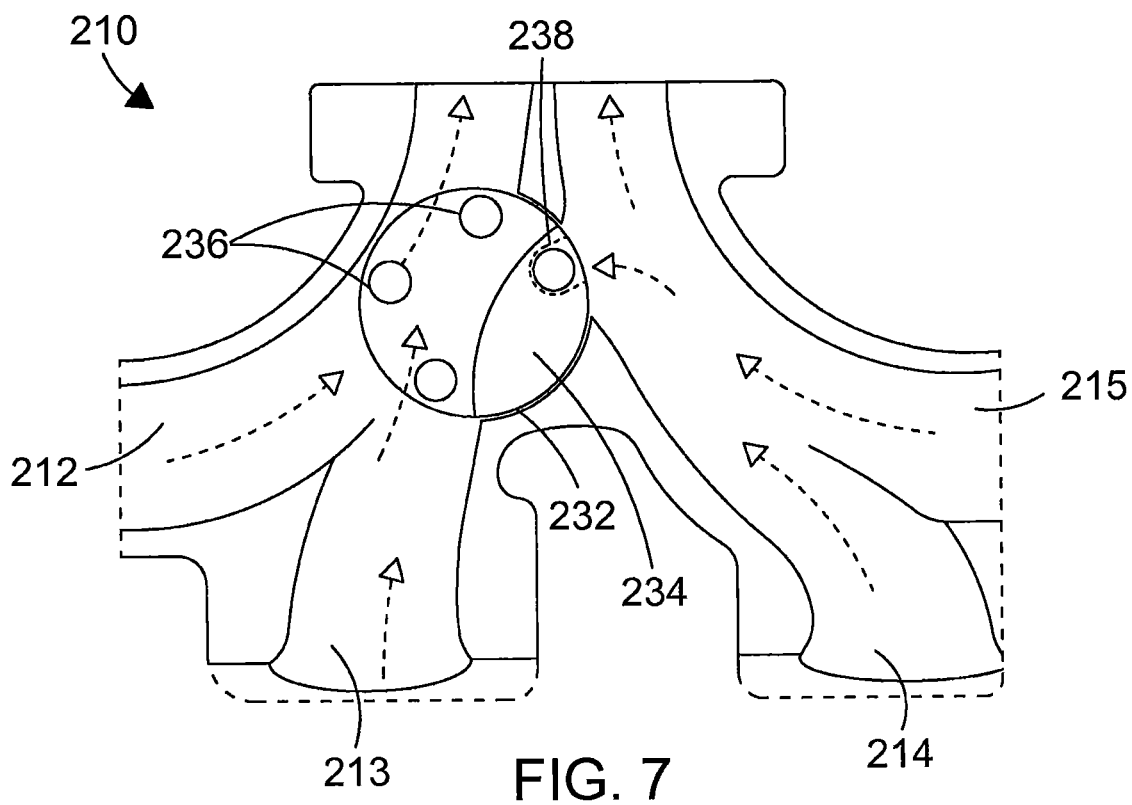

A third embodiment of an exhaust manifold for an internal combustion engine exhaust system is shown in schematic section views in FIGS. 5-7. Those figures illustrate various states of the manifold which are equivalents to those described above in relation to the first embodiment of the manifold.

Referring to FIG. 5, the manifold is generally designated 210 and comprises first and second exhaust gas inlets 212,213 which are connectable in a known manner to a first bank of cylinders of an internal combustion engine (not shown). The manifold 210 also comprises third and fourth exhaust gas inlets 214,215 which are connectable in the same way to a second bank of cylinders of the engine (not shown).

The manifold 210 also comprises separate first and second exhaust gas outlets 216,218 which are connectable in use to respective first and second volutes of a twin volute turbocharger (not shown). Located between, and in fluid communication with, the exhaust inlets 212,213,214,215 and outlets 216,218 is an exhaust chamber 220 which has at least one wastegate outlet connectable to a passage which bypasses the turbocharger. In the illustrated embodiment the chamber 220 has four wastegate outlets 222.

Also located in the chamber 220 is a diverter valve which is adapted to control the flow of exhaust gas from the exhaust gas inlets 212-215 to at least one of the first and second exhaust gas outlets 216,218 and the wastegate outlets 222. The diverter valve comprises a rotatable, cylindrical valve body 230 having an external wall 232, where the body may rotate under the power of a known actuator mechanism (e.g. solenoid) about an axis of rotation which is generally perpendicular to the direct of exhaust flow through the manifold. The body is predominantly hollow and the external wall 232 includes a number of inlet and outlet apertures (not shown) which allow the exhaust gas to flow through the body 230. The body 230 also includes a solid diverter portion 234 which fills approximately one third of the volume defined by the external wall 232, as shown in the end on views of FIGS. 5-7. It is this diverter portion 234 which diverts the exhaust gas flow depending upon the rotational position of the valve body 230. The body 230 is also provided with at least one wastegate aperture whose shape preferably corresponds with that of the at least one wastegate outlet in the chamber 220. As there are four wastegate outlets 222 in this embodiment there are four corresponding wastegate apertures 236 in the body 230. The diverter portion 234 also includes a cross-drilled wastegate passage 238, which is in fluid communication with the third and fourth exhaust gas inlets 214,215 and the wastegate outlets 222 when the valve is in the third state shown in FIG. 7. As will be described in more detail below, this wastegate passage 238 allows exhaust gas from the third and fourth inlets 214,215 to flow to the wastegate outlets 222 when the diverter portion 234 is keeping the exhaust flows from the first pair of inlets 212,213 and the second pair of inlets 214,215 separate.

Figure 8:
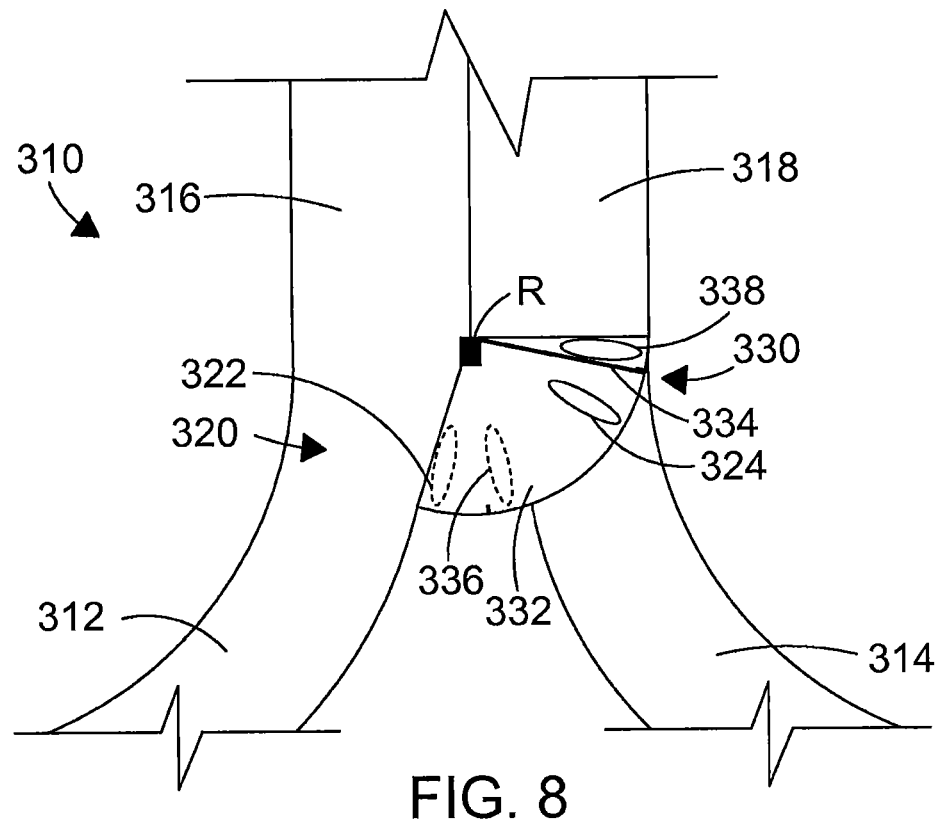
FIGS. 8-10 are schematic section views through a first embodiment of a twin volute turbocharger when in first, second and third states, respectively.
Figure 9:
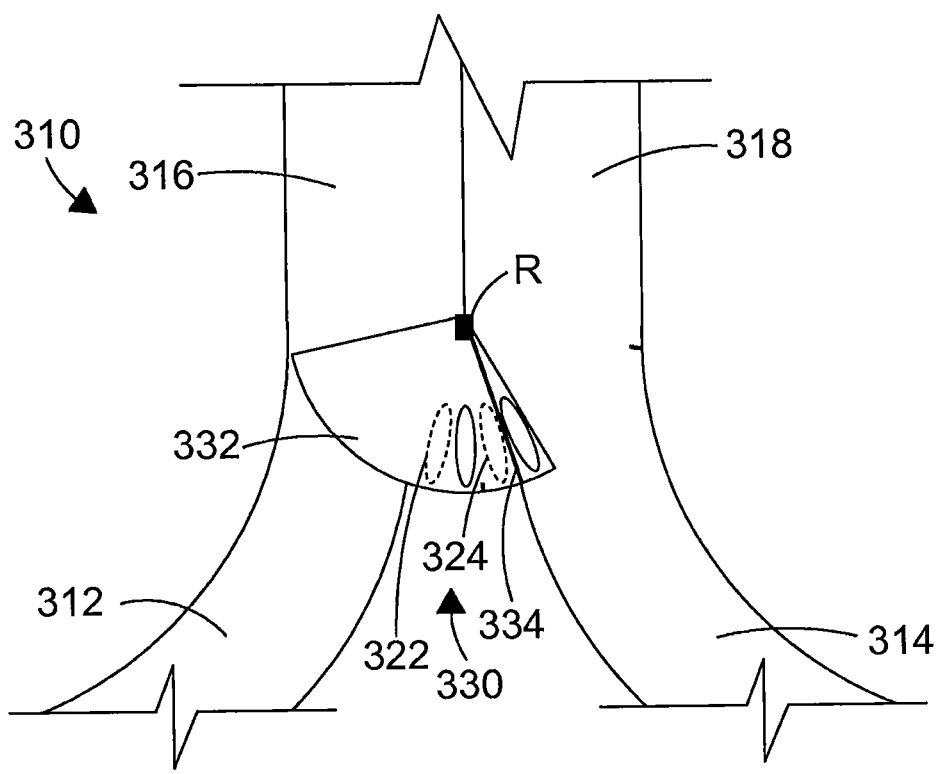
Figure 10:
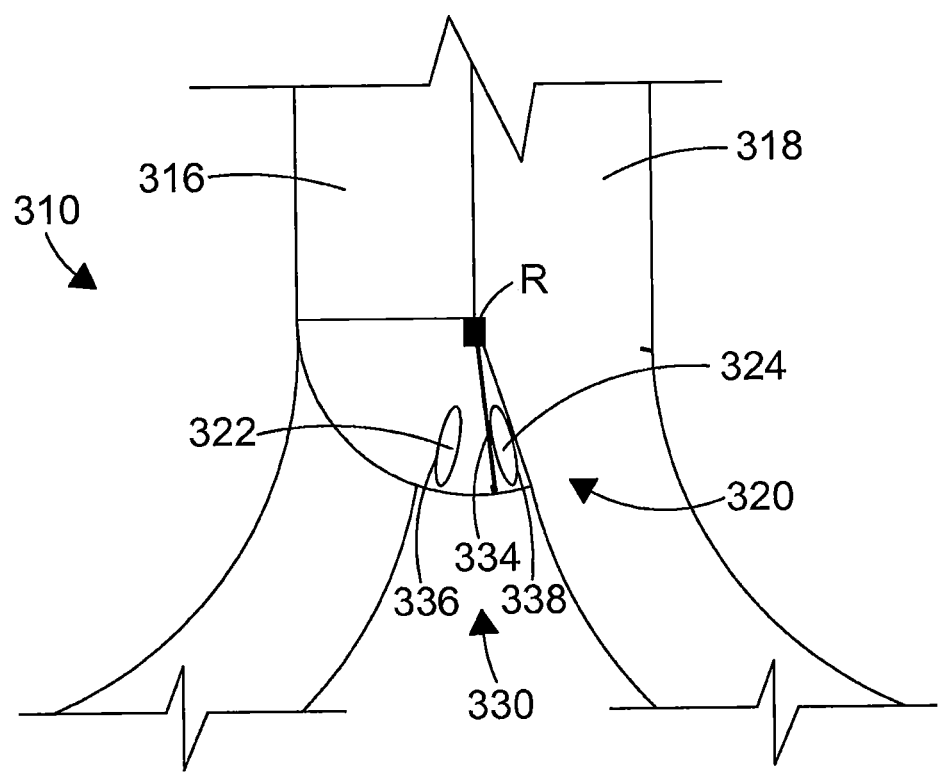

A first embodiment of a twin volute turbocharger is shown in schematic section views in FIGS. 8-10. For reasons of clarity, only the inlet to the turbocharger is shown in the figures. The remainder of the turbocharger can be assumed to be of a known design.

Referring to FIG. 8, the turbocharger is generally designated 310 and comprises a first exhaust gas inlet 312, which is connectable in a known manner to a first exhaust gas outlet of an exhaust manifold (not shown). The turbocharger 310 also comprises a second exhaust gas inlet 314, which is connectable in the same way to a second exhaust gas outlet of an exhaust manifold. The turbocharger 310 also comprises separate first and second volutes 316,318 which house the turbine over which the exhaust gas will flow.

Located between, and in fluid communication with, the exhaust inlets 312,314 and the volutes 316,318 is an exhaust chamber 320 which has at least one wastegate outlet connectable to a passage which bypasses the volutes. In the illustrated embodiment the chamber 320 has a pair of wastegate outlets 322,324.

Also located in the chamber 320 is a diverter valve 330 which is adapted to control the flow of exhaust gas from the first and second exhaust gas inlets 312,314 to at least one of the first and second volutes 316,318 and the wastegate outlets 322,324. The diverter valve 330 comprises a rotatable valve body having a base 332 shaped as a segment of a circle, where the base 332 may rotate under the power of a known actuator mechanism (e.g. solenoid) about an axis of rotation R. An upwardly projecting diverter plate 334 is mounted upon the rotatable base 332, and it is this diverter plate which diverts the exhaust gas flow. The base 332 is also provided with at least one wastegate aperture whose shape preferably corresponds with that of the at least one wastegate outlet in the chamber 320. As there are two wastegate outlets 322,324 in this embodiment there are a corresponding pair of wastegate apertures 336,338 in the base 332. The wastegate apertures 336,338 preferably lie either side of the diverter plate 334.

Figure 11:
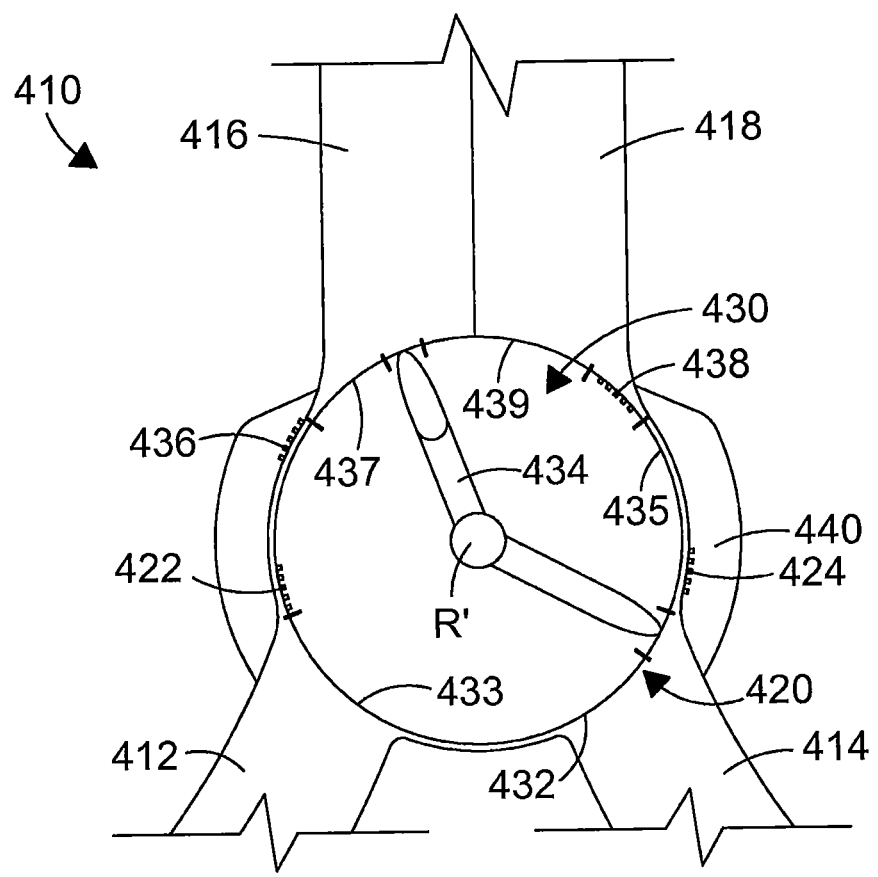
FIG. 11 is a schematic section view through a second embodiment of a twin volute turbocharger when in the first state.

An alternative embodiment of twin volute turbocharger is shown in FIG. 11 and generally designated 410. Again, only the inlet of the turbocharger is shown with the remainder of the turbocharger being of a known design. As with the first embodiment of FIGS. 8-10, this turbocharger 410 comprises a first exhaust gas inlet 412, which is connectable in a known manner to a first exhaust gas outlet of an exhaust manifold (not shown). The turbocharger 410 also comprises a second exhaust gas inlet 414, which is connectable in the same way to a second exhaust gas outlet of the manifold.

The turbocharger 410 also comprises separate first and second volutes 416,418. Located between, and in fluid communication with, the exhaust inlets 412,414 and volutes 416,418 is an exhaust chamber 420 which has at least one wastegate outlet connectable to a passage which bypasses the volutes 416,418. In the illustrated embodiment the chamber 420 has a pair of wastegate outlets 422,424 which, when open, are in fluid communication with a generally annular wastegate chamber 440 which is arranged in the form of a jacket about the exterior of the exhaust chamber 420. It is from the wastegate chamber 440 that the exhaust would flow to the bypass passage when the wastegate outlets 422,424 are open.

Also located in the chamber 420 is a diverter valve 430 which is adapted to control the flow of exhaust gas from the first and second exhaust gas inlets 412,414 to at least one of the first and second volutes 416,418 and the wastegate outlets 422,424. The diverter valve 430 comprises a rotatable valve body 432 having a generally cylindrical shape, where the body 432 may rotate under the power of a known actuator mechanism (e.g. solenoid) about an axis of rotation R'. The body 432 and the axis of rotation R' lie generally perpendicular to the direction of flow of exhaust gas through the manifold. The interior of the valve body 432 is divided into two portions by a diverter plate 434 which runs the length of the interior of the valve body, and it is this diverter plate which diverts the exhaust gas flow. The cylindrical wall of the body 432 has a pair of exhaust inlet apertures 433,435 and a pair of exhaust outlet apertures 437,439 which permit exhaust gas to flow through the valve body 432 depending upon its rotational position. One exhaust inlet aperture and one exhaust outlet aperture are provided on either side of the diverter plate 434. The body 432 also has at least one wastegate aperture whose shape and size preferably corresponds with that of the at least one wastegate outlet in the chamber 420. As there are two wastegate outlets 422,424 in this embodiment there are a corresponding pair of wastegate apertures 436,438 in the base 432.

INDUSTRIAL APPLICABILITY

The manner in which the manifold and turbocharger of the present invention operate will now be described. It should be noted that the second embodiment of the manifold shown in FIG. 4 has the valve in the same position as in FIG. 1, and is also able to move between first, second and third positions which are the same as those shown in FIGS. 1-3. Similarly, it should be noted that whilst the operation of the turbocharger is described with particular reference to the positions taken up by the first embodiment shown in FIGS. 8-10 the second embodiment shown in FIG. 11 can also move between the same first, second and third positions.

There are three positions which the diverter valve in both the first and second embodiments of the manifold may take up, depending on the performance demands of the engine and boost pressure of the turbocharger. The diverter valve may default to the state shown in either FIG. 2 or FIG. 3, with the exhaust flow remaining divided by the valve and with the wastegate closed or at least partially open. Most preferably, the valve defaults to the state shown in FIG. 3, with full wastegating provided by the fully open wastegate outlets to prevent overspeed or overboost of the turbocharger. In use, the actuator which operates the diverter valve body will be in communication with a controller, which may be the main electronic control unit (ECU) of the engine or else a dedicated manifold controller which itself is in communication with the main ECU. The main ECU monitors acceleration demands placed upon the engine by the vehicle operator, which may be done via a position sensor on the accelerator pedal of the vehicle, for example. The main ECU also monitors the boost pressure being provided by the turbocharger to the engine. Sensing arrangements for this purpose are well known, and will not be described in any more detail here.

When the operator places an acceleration demand via the accelerator pedal of the vehicle, rapid spooling up of the turbocharger is required so as to achieve the increase in engine power needed to meet the acceleration demand. To achieve this the controller instructs the valve actuator to move to the position shown in FIGS. 1 (and 4). In this first position, the diverter plate 34,134 of the valve 30,130 lies between the second exhaust inlet 14,114 and the second exhaust outlet 18,118 so as to perform a "converger" function. This means that the exhaust gas flow from both banks of cylinders converges on the first outlet 16,116 and flows on into the first volute 19 of the turbocharger. In this first position the wastegate outlets 22,24,122,124 are closed by the valve 30,130. Directing all of the exhaust flow into a single volute in this way improves the response of the turbocharger by effectively halving the turbine flow capacity.

When there is no acceleration demand placed upon the engine, and the boost pressure of the turbocharger is under a pre-determined limit, the controller will instruct the actuator to move the valve 30 into a second "steady state" position shown in FIG. 2. In the second position, the valve base 32 has rotated clockwise about the rotational axis R so that the diverter plate 34 now acts to keep the exhaust flow from the first and second inlets 12,14 separate. Thus, the exhaust flow from the first bank of cylinders enters the first inlet 12 and passes through the first outlet 16 into the first volute of the turbocharger. Similarly, the exhaust flow from the second bank of cylinders enters the second inlet 14 and passes through the second outlet 18 into the second volute of the turbocharger. As with the first position, the wastegate outlets 22,24 are still closed by the valve 30 in the second position.

At any point during the operation of the engine the controller may determine that the boost pressure, or speed, of the turbocharger has reached or exceeded the pre-determined limit. To relieve the pressure and/or reduce the speed, the controller instructs the actuator to move the valve 30 further clockwise about the axis R into the third position shown in FIG. 3. In this third position the diverter plate 34 still keeps the two exhaust flows from the banks of cylinders separate as they pass through the manifold 10 into the respective volutes of the turbocharger. However, now the wastegate apertures 36,38 in the valve base 32 are aligned with the wastegate outlets 22,24 in the chamber 20 so that at least part of the exhaust flow on both sides of the manifold 10 now enters the wastegate passage and bypasses the turbocharger. Hence, the boost pressure or speed of the turbocharger is reduced and/or maintained at the pre-determined pressure limit.

For the avoidance of doubt, the same positions are also achieved in the second embodiment of the manifold shown in FIG. 4. The only difference in the second embodiment being that the wastegate outlets 122,124 and wastegate apertures 136,138 are located upon the circumference of the chamber 120 and valve 130, respectively.

As with the first two embodiments of the manifold, there are three positions which the diverter valve in the third embodiment of the manifold may take up. The diverter valve may default to the state shown in either FIG. 6 or FIG. 7, with the exhaust flow remaining divided by the valve and with the wastegate closed or at least partially open. Most preferably, the valve defaults to the state shown in FIG. 7, with full wastegating provided by the fully open wastegate outlets to prevent overspeed or overboost of the turbocharger. In use, the actuator which operates the diverter valve body will be in communication with a controller, which may be the main electronic control unit (ECU) of the engine or else a dedicated manifold controller which itself is in communication with the main ECU. The main ECU monitors acceleration demands placed upon the engine by the vehicle operator, which may be done via a position sensor on the accelerator pedal of the vehicle, for example. The main ECU also monitors the boost pressure being provided by the turbocharger to the engine.

When the operator places an acceleration demand via the accelerator pedal of the vehicle, rapid spooling up of the turbocharger is required so as to achieve the increase in engine power needed to meet the acceleration demand. To achieve this the controller instructs the valve actuator to move to the position shown in FIG. 5. In this first position, the diverter portion 234 of the valve body 232 prevents exhaust gas flowing in from the first and second inlets 212,213 from flowing out through the first outlet 216. Instead, the exhaust gas flow from both banks of cylinders converges on the second outlet 218 and flows on into the respective volute of the turbocharger. In this first position the wastegate outlets 222 are closed by the valve 232 as the wastegate apertures 236 are not even partially aligned with the wastegate outlets 222.

When there is no acceleration demand placed upon the engine, and the boost pressure of the turbocharger is under a pre-determined limit, the controller will instruct the actuator to move the valve body 232 into a second "steady state" position shown in FIG. 6. In the second position, the valve body 232 has rotated clockwise about its rotational axis so that the diverter portion 234 now acts to keep the exhaust flow from the first and second inlets 212,213 separate from that of the third and fourth inlets 214,215. Thus, the exhaust flow from the first and second inlets 212,213 passes through the valve 230 to the first outlet 216 into the first volute of the turbocharger. Similarly, the exhaust flow from the third and fourth inlets 214,215 passes through the valve 230 to the second outlet 218 and on into the second volute of the turbocharger. As with the first position, the wastegate outlets 222 are still closed because the wastegate apertures 236 in the valve body 232 remain out of rotational alignment with the wastegate outlets 222.

As with the preceding embodiments the controller may determine that the boost pressure, or speed, of the turbocharger has reached or exceeded the pre-determined limit. To relieve the pressure and/or reduce the speed, the controller instructs the actuator to rotate the valve body 232 further clockwise about the rotational axis into the third position shown in FIG. 7. In this third position the diverter portion 234 in the body 232 still keeps the two exhaust flows from the pairs of exhaust inlets separate as they pass through the manifold 210 into the respective volutes of the turbocharger. However, now the wastegate apertures 236 in the valve body 232 are aligned with the wastegate outlets 222 in the chamber 220 so that at least part of the exhaust flow from the first and second exhaust inlets 212,213 now enters the wastegate and bypasses the turbocharger. In addition, the inlet of the wastegate passage 238 is now in fluid communication with the third and fourth exhaust inlets 214,215 such that a portion of that inlet flow also passes through the wastegate passage 238 in the diverter portion 234 and out via the wastegate outlets. Hence, the boost pressure or speed of the turbocharger is reduced and/or maintained at the pre-determined pressure limit.

As with the embodiments of the manifold there are three positions which the diverter valve in both the first and second embodiments of the turbocharger may take up, depending on the performance demands of the engine and boost pressure of the turbocharger. The diverter valve may default to the state shown in either FIG. 9 or FIG. 10, with the exhaust flow remaining divided by the valve and with the wastegate closed or at least partially open. Most preferably, the valve defaults to the state shown in FIG. 10, with full wastegating provided by the fully open wastegate outlets to prevent overspeed or overboost of the turbocharger. In use, the actuator which operates the diverter valve body will be in communication with a controller, which may be the main electronic control unit (ECU) of the engine or else a dedicated turbocharger controller which itself is in communication with the main ECU. The main ECU monitors acceleration demands placed upon the engine by the vehicle operator, which may be done via a position sensor on the accelerator pedal of the vehicle, for example. The main ECU also monitors the boost pressure being provided by the turbocharger to the engine.

When the operator places an acceleration demand via the accelerator pedal of the vehicle, rapid spooling up of the turbocharger is required so as to achieve the increase in engine power needed to meet the acceleration demand. To achieve this the controller instructs the valve actuator to move to the position shown in FIGS. 8 (and 11). In this first position, the diverter plate 334,434 of the valve 330,430 lies between the second exhaust inlet 314,414 and the second exhaust outlet 318,418 so as to perform a "converger" function. Hence, the exhaust gas flow from both inlets 312,412,314,414 converges on the first outlet 316,416 and flows on into the associated first volute of the turbocharger 310. In this first position the wastegate outlets 322,324,422, 424 are closed by the valve 330,430.

When there is no acceleration demand placed upon the engine, and the boost pressure of the turbocharger is under a pre-determined limit, the controller will instruct the actuator to move the valve 330 into a second "steady state" position shown in FIG. 9. In the second position, the valve base 332 has rotated clockwise about the rotational axis R so that the diverter plate 334 now acts to keep the exhaust flow from the first and second inlets 312,314 separate. Thus, the exhaust flow from the first inlet 312 passes through the first outlet 316 into the first volute of the turbocharger. Similarly, the exhaust flow from the second inlet 314 passes through the second outlet 318 into the second volute of the turbocharger. As with the first position, the wastegate outlets 322,324 are still closed by the valve 330 in the second position.

At any point during the operation of the engine the controller may determine that the boost pressure, or speed, of the turbocharger has reached or exceeded the pre-determined limit. To relieve the pressure and/or reduce the speed, the controller instructs the actuator to move the valve 330 further clockwise about the axis R into the third position shown in FIG. 10. In this third position the diverter plate 334 still keeps the two exhaust inlet flows separate as they pass through the chamber 320 into the respective volutes 316,318 of the turbocharger 310. However, now the wastegate apertures 336,338 in the valve base 332 are aligned with the wastegate outlets 322,324 in the chamber 320 so that at least part of the exhaust flow on both sides of the chamber 320 now enters the wastegate passage and bypasses the turbocharger volutes 316,318. Hence, the boost pressure or speed of the turbocharger is reduced and/or maintained at the pre-determined pressure limit.

For the avoidance of doubt, the same positions are also achieved in the second embodiment of the turbocharger shown in FIG. 11. The only difference in the second embodiment being that the wastegate outlets 422,424 and wastegate apertures 436,438 are located upon the circumference of the chamber 420 and valve 430, respectively.

The present invention provides an exhaust manifold and turbocharger which are able to perform a converger function when an acceleration demand is placed upon the engine, as well as providing integrated wastegate functionality when an overboost is detected. Providing a manifold or turbocharger that performs both the converger and wastegating functions using a single valve arrangement reduces the complexity and cost of adding this functionality to the manifold or turbocharger. Furthermore, both the manifold and turbocharger of the present invention keep the exhaust flow from the banks of cylinders separate other than when in the first "converger" position. This means that there is no interference to either flow from the other, thereby maintaining the optimal gas flow into the twin volutes of the turbocharger.

As well as moving between the three specific positions described above, the controller and actuator may combine to move the valve to other positions which are intermediate the three shown. For example, to achieve partial wastegating of the turbocharger whilst still maintaining steady state operation the valve body may be rotated such that the wastegate outlets and the wastegate apertures in the valve body are partially aligned as opposed to being fully aligned.

The manifold or turbocharger of the present invention may have more than one or two wastegate outlets and respective wastegate apertures. For example, there may be four wastegate outlets and respective wastegate apertures. In addition, the wastegate apertures of the diverter valve may all be on the same side of the diverter plate rather than arranged on both sides of the plate.

Although not illustrated, a turbocharger utilising the valve arrangement of the manifold shown in FIGS. 5-7 also forms part of the present invention. The only significant difference when utilising that valve arrangement in a turbocharger rather than a manifold is that instead of four inlets there would only be two inlets. For example, inlets 212 and 215 would not be present with instead only a pair of turbine inlets represented by inlets 213 and 214. Outlets 216,218 would be connected directly to the two volutes of the turbocharger.

Other modifications and improvements may be incorporated without departing from the scope of the invention as defined by the accompanying patent claims.

The invention claimed is:

1. An exhaust manifold for an internal combustion engine, the manifold comprising:
   at least one first exhaust gas inlet connectable to a first bank of cylinders of the engine;
   at least one second exhaust gas inlet connectable to a second bank of cylinders of the engine;
   a first and a second exhaust gas outlet connectable to a first and a second volute of a twin volute turbocharger, respectively;
   at least one wastegate outlet connectable to a bypass passage which bypasses the turbocharger; and
   a diverter valve located within the manifold, wherein the diverter valve is adapted to selectively direct an exhaust gas from the first and the second inlets to at least one of the first and the second exhaust gas outlets and the wastegate outlet;
   wherein the diverter valve includes a valve body having at least one wastegate aperture which must be at least partially aligned with the at least one wastegate outlet for the exhaust gas to be directed to the wastegate outlet;

wherein the valve body is rotatable and includes a diverter plate which diverts flow of the exhaust gas.

2. The exhaust manifold of claim 1, wherein the diverter valve is adapted to selectively move between:
 (i) a first position in which the valve diverts the exhaust gas from each inlet to the first exhaust gas outlet, and prevents flow of the exhaust gas through the at least one wastegate outlet;
 (ii) a second position in which the valve maintains separate flows of the exhaust gas from the each inlet to the first and the second exhaust gas outlets, respectively, and prevents flow of the exhaust gas through the at least one wastegate outlet; and
 (iii) a third position in which the valve maintains the separate flows of the second position, and permits flow of the exhaust gas through the at least one wastegate outlet.

3. The exhaust manifold of claim 1, wherein the diverter valve is located in an exhaust chamber intermediate the exhaust gas inlets and the exhaust gas outlets, and the at least one wastegate outlet is in fluid communication with the exhaust chamber.

4. The exhaust manifold of claim 3, wherein the valve body is a rotary valve body and the diverter plate is mounted upon a rotatable base, wherein the at least one wastegate aperture is provided in the rotatable base.

5. The exhaust manifold of claim 4, wherein the manifold has a pair of wastegate outlets and the rotatable base has a corresponding pair of wastegate apertures, wherein the corresponding pair of wastegate apertures are provided in the base on opposite sides of the diverter plate.

6. The exhaust manifold of claim 3, wherein the valve body is a rotatable cylindrical body having an external wall and the diverter plate divides the body into two portions, and the wall of the body includes inlet and outlet exhaust gas apertures and the at least one wastegate aperture.

7. The exhaust manifold of claim 6, further comprising a wastegate chamber arranged about an exterior of the exhaust chamber and in fluid communication with the bypass passage, wherein the at least one wastegate outlet connects the exhaust chamber and the wastegate chamber.

8. A twin volute turbocharger for an internal combustion engine, the turbocharger comprising:
 a first exhaust gas inlet connectable to a first exhaust gas outlet of an exhaust manifold;
 a second exhaust gas inlet separate from the first exhaust gas inlet and connectable to a second exhaust gas outlet of the exhaust manifold;
 a first and a second volute in fluid communication with the first and the second exhaust gas inlets, respectively;
 at least one wastegate outlet connectable to a bypass passage which bypasses the first and the second volutes; and
 a diverter valve located between the exhaust gas inlets and the volutes, wherein the diverter valve is adapted to selectively direct an exhaust gas from the first and the second inlets to at least one of the first and the second volutes and the wastegate outlet;
 wherein the diverter valve includes a valve body having at least one wastegate aperture which must be at least partially aligned with the at least one wastegate outlet for the exhaust gas to be directed to the wastegate outlet;
 wherein the valve body is rotatable and includes a diverter plate which diverts flow of the exhaust gas.

9. The turbocharger of claim 8, wherein the diverter valve is adapted to selectively move between:
 (iv) a first position in which the valve diverts the exhaust gas from both the inlets to the first volute, and prevents flow of the exhaust gas through the at least one wastegate outlet;
 (v) a second position in which the valve maintains separate flows of the exhaust gas from the first and the second inlets to the first and the second volutes, respectively, and prevents flow of the exhaust gas through the at least one wastegate outlet; and
 (vi) a third position in which the valve maintains the separate flows of the second position, and permits flow of the exhaust gas through the at least one wastegate outlet.

10. The turbocharger of claim 9, wherein the diverter valve is located in an exhaust chamber intermediate the exhaust gas inlets and the volutes, and the at least one wastegate outlet is in fluid communication with the exhaust chamber.

11. The turbocharger of claim 10, wherein the valve body is a rotary valve body and the diverter plate is mounted upon a rotatable base, wherein the at least one wastegate aperture is provided in the rotatable base.

12. The turbocharger of claim 11, wherein the turbocharger has a pair of wastegate outlets and the rotatable base has a corresponding pair of wastegate apertures, wherein the corresponding pair of wastegate apertures are provided in the base on opposite sides of the diverter plate.

13. The turbocharger of claim 10, wherein the valve body is a rotatable cylindrical body having an external wall and the diverter plate divides the body into two portions, and the wall of the body includes inlet and outlet exhaust gas apertures and the at least one wastegate aperture.

14. The turbocharger of claim 13, further comprising a wastegate chamber arranged about an exterior of the exhaust chamber and in fluid communication with the bypass passage, wherein the at least one wastegate outlet connects the exhaust chamber and the wastegate chamber.

* * * * *